Feb. 23, 1932.  T. CARROLL ET AL  1,846,792
DISTANT TYPE INDICATING INSTRUMENT AND THE LIKE
Filed Jan. 29, 1927
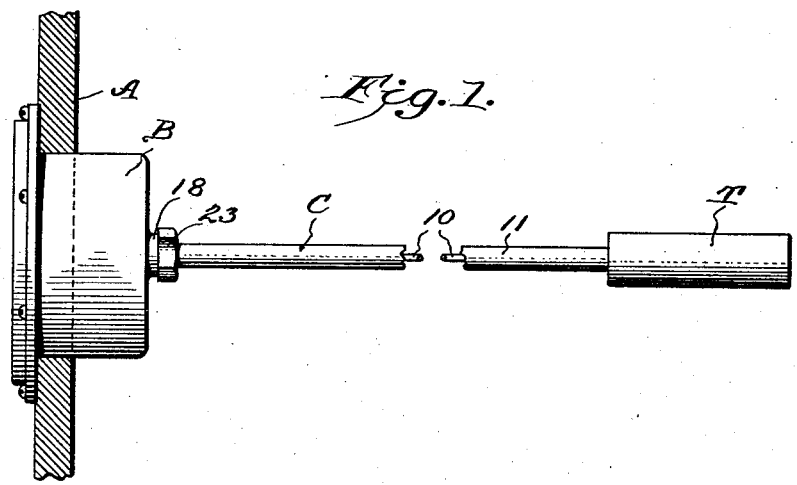
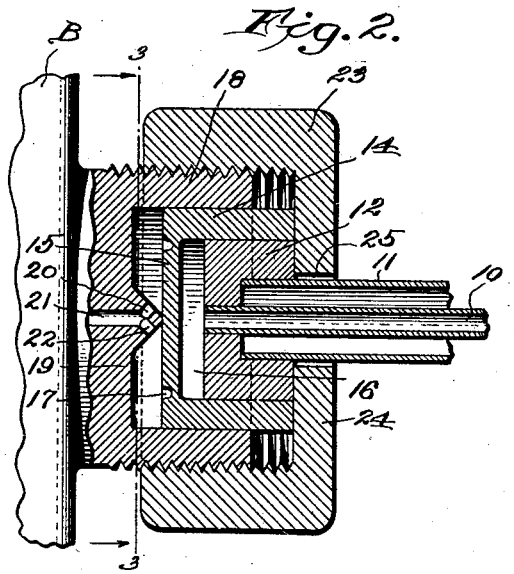
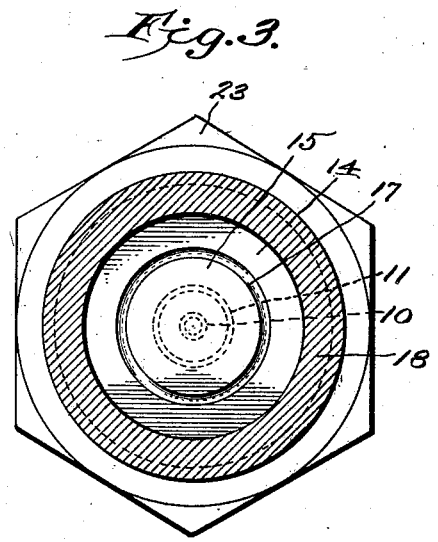
Inventors,
Thomas Carroll
George L. Lawson
by Albert E. Fochs
Attorney Patented Feb. 23, 1932

1,846,792

UNITED STATES PATENT OFFICE

THOMAS CARROLL AND GEORGE L. DAWSON, OF HAMPTON, VIRGINIA

DISTANT TYPE INDICATING INSTRUMENT AND THE LIKE

Application filed January 29, 1927. Serial No. 164,497.

This invention relates to certain improvements in distant type indicating instruments and the like; and the nature and objects of the invention will be readily recognized and understood by those skilled in the arts involved in the light of the following explanation and detailed description of the accompanying drawings, illustrating what we, at present, consider to be the preferred embodiments or mechanical expressions of our invention from among various other forms, arrangements, combinations and constructions of which the invention is capable within the spirit and scope thereof.

More particularly the invention is directed to the solution of certain problems and the elimination of certain disadvantages encountered in the operation and use of indicating instruments and the like of the distant type, that is, of the type in which the indicating instrument is located at a distance from the location of the conditions to be indicated, such for example as instruments of the pressure operated type exemplified by thermometers of the Bourdon gage type for indicating temperatures. This type of thermometer or temperature indicating instrument is of general use and application on and in connection with automotive vehicles such as automobiles, aircraft, and boats, for indicating the temperature of the cooling liquid of an internal combustion motor driving the same. In the use of these instruments on aircraft, such as airplanes, the indicating instrument or gage is generally located on the pilot's instrument board, and is operatively coupled through the medium of a capillary tube with a bulb located at the point where the temperature is to be determined. The capillary tube and bulb are filled with a fluid under the proper pressure and the tube is permanently connected to and forms a fixed part of the pressure or Bourdon type of gage, so that the bulb forms the thermal element and the fluid therein expands and contracts in accordance with temperature changes, to vary the pressure of the fluid in the capillary tube and thereby cause actuation by the pressure of the Bourdon gage to give an indication or reading of the temperature at the thermal element. These capillary tubes are very fragile and delicate as will be readily understood by those familiar with these types of instruments and great difficulty is encountered through breakage thereof due to vibration, shock and other conditions encountered with these instruments mounted on an airplane or other vehicle. When a break occurs in one of these capillary tubes, or a leak of any kind occurs, the instrument with which the tube is connected, is rendered useless for giving accurate readings or indications. Under the prevailing practice and construction of these types of instruments, breakage of the tube or leakage therein, necessitates removal of the entire assembly (gage, tube and thermal element) and the replacement thereof with a new gage, capillary tube and thermal element. It is necessary with these instruments, that the capillary tube be attached into operative relation with the gage before installation, in order to maintain the proper and required predetermined pressure of the fluid within the tube and thermal element and the gage.

A fundamental and primary object of the present invention, is to eliminate the foregoing disadvantages of the types of indicating instruments referred to by the provision of a capillary tube and thermal element which forms a sealed unit for attachment to an indicating instrument of the pressure type, so that upon breakage of, or leakage in a tube or thermal element, the same can be readily and quickly removed and a new capillary tube unit inserted in its place in operative non-leaking connection and relation with the instrument or gage, without removing or discarding and replacing the gage.

A further object of the invention resides in the provision of an indicating instrument of the pressure or Bourdon type having a removable capillary tube which forms a sealed unit when applied to the gage and connected therewith, and which sealed unit is unsealed by the act of attachment to the instrument or gage for placing the capillary tube and its contained fluid in non-leaking connection with the gage.

A further object of the invention lies in the provision of a detachable fitting for coupling a sealed capillary tube unit to an instrument or gage of the pressure actuated type, which fitting is leakproof in attached position, but which is readily detached to permit removal of a tube unit and replacement by a new unit.

Another object of the invention is to provide a gage of the pressure or Bourdon type, having a member for puncturing or unsealing a sealed capillary tube unit when such unit is attached and connected in operative relation to the gage.

A further object of the invention is to provide a detachable coupling and fitting for securing a sealed fluid containing tube unit to and with an element with which said unit is to be placed in communication, the said coupling and fitting puncturing or unsealing the tube unit when the same is applied and attached.

Another object of the invention is to provide as a new article of manufacture, a sealed capillary tube and bulb unit, having the contained fluid under the proper predetermined pressure for use with pressure gages or indicating instruments as replacements for broken or leaking tubes and elements of such instruments, and to further provide a detachable coupling or fitting for connecting such a unit to a gage and for puncturing or unsealing the unit when coupled to the gage.

With the foregoing general objects and certain other objects and results in view, which other objects and results will be readily apparent from the following explanation, the invention consists in certain novel features in construction and in combinations and arrangements of elements, as will be more fully and particularly referred to and specified hereinafter.

Referring to the accompanying drawings in which similar reference characters refer to corresponding parts throughout the several figures thereof:

Fig. 1 is a view in side elevation, more or less diagrammatical, showing a thermometer of the pressure or Bourdon gage type mounted on and installed in an instrument board, a portion of which only is shown, of an airplane, with the sealed unit of the invention embodying a capillary tube and thermal element in mounted and applied operative position and relation on and in connection with the gage.

Fig. 2 is a vertical transverse section through the fitting and coupling removably connecting and attaching the tube unit to the gage, showing the coupling in position for application and connection to the gage to unseal the tube and place the same in non-leaking connection and communication therewith.

Fig. 3 is a vertical section taken on the line 3—3 of Fig. 2, and showing the sealed inner end of the tube unit for puncturing or unsealing by the gage fitting or nipple.

The invention is disclosed herewith as embodied in a pressure thermometer of the Bourdon type for mounting on and in connection with an airplane instrument board and internal motor cooling system. This application and adaptation of the principles and features of the invention are presented purely by way of example and not of limitation, and were selected because, with the installation of these types of instruments on aircraft and particularly airplanes, the problem and the disadvantages which the invention eliminates, are met with in a very exaggerated degree, due to the large amount of vibration and the variety of shocks to which such instruments are subjected in the operation and flight of aircraft. It will be obvious, to those familiar with the art, that the principles and features of the invention are capable of a wide range of adaptations and applications to a variety of other types of instruments for other purposes and for mounting an installation in other ways and in connection with other elements. Hence, it is not in any way intended to limit the invention or restrict the same to the embodiment, application and installation, or to the type of instrument presented herewith for the purpose of explaining the invention to enable those skilled in the art to understand the same.

In Fig. 1 of the accompanying drawings, a portion of an airplane instrument board A is shown with a thermometer B of the Bourdon or pressure gage type mounted thereon and therein with the indicating face of the instrument visible on the instrument board and the body of the instrument extending rearwardly through the instrument board, in the usual manner well understood by those familiar with the mounting of aircraft instruments. The thermometer or gage B is operatively coupled and connected with a capillary tube unit C which extends to and is in communication with a bulb or thermal element T for mounting at and in that portion or point of the motor cooling system from which it is desired to indicate the temperatures at the gage B on the instrument board A. As referred to hereinbefore, according to the prevailing and generally employed, construction and arrangement of these distant type indicating instruments, the capillary tube C is permanently fixed and connected to the instrument or gage so that it is impossible or impracticable to replace or renew a broken or leaking tube or thermal element, with the result that the gage and its connected capillary tube and thermal element must be renewed and completely replaced by another gage end tube.

According to the principles of the present invention, the thermal unit T and capillary tube C provide a sealed unit removably and detachably coupled to and connected with the gage B, for replacement by another such unit when desired or found necessary, all without removing and discarding or replacing the instrument or gage B. In the example of the invention disclosed herewith, the tube unit C embodies the capillary tube 10 enclosed within a protecting and guarding tube or casing 11, with the thermal element T fixed to the tube 10 and casing 11 with tube 10 opening and in communication with the bulb forming the thermal element T. At the forward or gage end of the tube unit C, the capillary tube 10 extends a distance beyond, see Fig. 2, the end of the protecting casing 11, and an end block 12 having an axial bore therethrough, which is recessed or enlarged at one side to receive the end of casing 11, is soldered or otherwise fixed and secured over and closing the end of casing 11 with the end of capillary tube 10 fitting tightly in and extending through the bore of the end block 12. A sealing cap or closure 14, is fitted tightly over and on and around the end block, with the outer or end wall 15 of the cap or closure 14, spaced outwardly a distance from the outer face of block 12 to form a chamber 16 between the end block and wall 15 with which the capillary tube 10 is in communication. The edge of the cap or closure 14, preferably lies flush with and as a continuation of the adjacent face of end block 12, as will be clear by reference to Fig. 2 of the drawings. The end wall 15 of the sealing cap or closure 14, is formed with an annular groove 17, around its outer face adjacent and in proximity to the side wall or flange of the cap, to form a weakened structure so that pressure applied to the wall 15 will break or fracture the same at the groove, and sever this wall 15 from the cap. If desired or found expedient, the end wall 15 of the sealing cap 14 can be formed of a soft material which can be readily pierced or punctured or can be formed, if desired, of a frangible and readily broken material, all of which will be more fully referred to and explained hereinafter. The capillary tube unit C, with the bulb or thermal element T, and the instrument or gage end of the tube 10, sealed and closed against leakage by the cooperating end block 12 and closure cap 14, is filled or charged with a fluid under a predetermined required pressure for the instrument with which it is to be employed, so that changes of temperature, when installed, will cause the expansion and contraction of the fluid in the thermal unit T with corresponding variations and pressure in and through the capillary tube 10.

The gage or instrument B is formed with a coupling member or nipple 18 which extends rearwardly from the gage, and is formed with an inwardly extending recess or opening to receive and form a tight running fit with the sealing closure at and on the gage end of the tube unit C. The exterior side wall of nipple 18 is screw threaded and the base or inner end of the recess or opening in the nipple, is closed by wall 19 having a central or axial projecting point or head 20 of relatively cone shape, having a pointed outer end. A duct or passage 21, is formed through the base or inner end wall of the nipple 18, extending axially therethrough to the cone shaped projecting point 20 where it is in communication with lateral ports or openings 22 through the side walls of head 20, to place the chamber 16 in communication with duct or passage 21 through these head ports 22. The duct or passage 21 extends inwardly to the gage or instrument B where it is in operative communication with the pressure actuated element or member of the gage (not shown) as will be readily understood by those familiar with these types of gages.

The tube unit C is adapted to be coupled and connected at its sealed end with the connecting or coupling nipple 18 of the gage B, and this is accomplished by the provision of an internally screw threaded coupling member 23 adapted to be threaded over and screwed on to the externally threaded gage nipple 18. The coupling member 23 is provided with the outer end wall 24 having the central opening 25 therethrough which loosely receives and through which the tube unit C extends, with the inner face of the wall 24 rotatably bearing upon the outer faces of the end block 12, and the side wall of the sealing cap 14, which will be readily understood by reference to Fig. 2 of the accompanying drawings. The sealed tube unit includes and has the coupling member 23 loosely mounted thereon for coupling the unit to a gage as will be explained hereinafter.

In the operation and use of the gage and tube unit of the invention, the gage A is mounted at the desired point, such for example as on the instrument board A, and a tube unit C of the proper length for the installation with which it is to be used, is mounted with the thermal unit or bulb T thereof, disposed and located at the point at which temperatures are to be taken. The sealed end of the tube unit having the cap 14, and the coupling member 23, is then inserted in and over the gage or instrument connecting nipple 18, with the sealing cap 14, fitting slidably and tightly within the opening or recess of the nipple and the coupling member fitting over the nipple for threaded engagement therewith. Then, by screwing the coupling member 23 over and inwardly on to the nipple 18, the sealed end of the tube unit is forced inwardly through the nipple opening or recess toward the base or inner wall 19 thereof until the end wall 15 of cap 14 is engaged by the projecting point or head 20. Upon continued inward movement of the sealing cap 14 by the coupling member 23, the end wall 15 of the cap will be broken or fractured along the groove 17 from the cap, and the chamber 16 will then be placed in communication through ports 22 with the duct or passage 21 leading to the gage operating mechanism. The end wall 15 after it is broken from the cap is then loosely confined between the block 12 and head 20, it being obvious that the coupling member 23 is not screwed onto nipple 19 a sufficient distance to force wall 15 over and closing the tube end. Any suitable arrangement being provided to limit inward movement of the coupling member, as for example, by terminating the exterior threads on the nipple at the proper distance inwardly from the outer end of the nipple. Upon breaking or fracturing cap wall 15, the fluid under pressure within the previously sealed tube unit C, passes into the gage through passage 21, and the pressure in the instrument and unit C with thermal element T is the same or equalized, so that upon variations in temperature at the thermal element T, the fluid therewithin will contract and expand resulting in decreasing and increasing the pressure of the fluid within the capillary tube 10, and the gage actuating mechanism to cause operation thereof and indication by the gage of the temperature at the thermal element T. Attention is here directed to the fact that the invention is not limited to the form of breakable or fracturable sealing cap shown in which the end wall 15 of the cap is severed or broken from the cap by the projecting head 20, but that the invention contemplates and includes a soft material cap end wall for piercing or puncturing by the projecting head 20, or of a frangible material which can be broken by engagement with the head.

With an instrument and capillary tube unit of the invention installed and in operation and use, in the event of breakage or leakage at any point in the capillary tube or element T, the tube unit can be quickly removed by unscrewing the coupling member 23 to release the heated end of the unit from the gage nipple, and the unit may then be removed from the installation. A new or replacement tube unit can then be quickly installed, the fluid in the unit being sealed therein under the proper pressure, by applying the coupling member to the gage nipple and forcing the sealed end of the new tube unit into the nipple where it is broken and unsealed by engagement with head 20 and the capillary tube with its fluid under pressure, placed in operative communication with the gage mechanism. The design and construction of the sealed end of the tube unit, together with the coupling member 23 and the tight sliding fit formed between the sealing cap 14 and the inner wall of the nipple recess, provides a tight leak proof coupling and connection between the tube unit and the gage, yet, which connection can be readily uncoupled and detached and coupled and applied as may be desired. It is essential to the proper successful operation of these types of pressure indicating instruments, that there be no leakage of the fluid under pressure which operates the same, otherwise accuracy and proper operation is impossible. The detachable coupling provided by the invention for and between a sealed tube unit having a fluid under pressure therein, and a gage or other element placed in communication with such unit, insures a leak proof connection and coupling with resulting accurate operation of the instrument.

While the invention is primarily intended for use and embodiment with indicating instruments of the pressure type, and is so shown and described, herewith, it is also applicable and adapted for use broadly in providing a coupling between a sealed unit with fluid under pressure therein, and an element to be placed in communication with such unit. Further, the arrangement and construction of the sealed end of the tube unit having a breakable, puncturable or shatterable cap end wall, is capable of general use for a variety of purposes, and particularly in combination with the arrangement of coupling member and attaching nipple with its cap engaging and breaking projecting head. Attention is here directed to the fact that the broad principles of the invention contemplate and include other means and constructions for closing the tube unit, such for example by a low fusing point sealing material which when melted by application of heat opens the tube; or by distortion of a portion of the unit to close the tube, such that force applied to the tube in the required manner and direction will open the same; the invention broadly residing in the provision of a presealed capillary tube unit and the like for attachment to a means or instrumentality with which it is to be utilized.

It is also evident that various changes, modifications, variations and substitutions might be resorted to without departing from the spirit and scope of our invention, and hence we do not wish to limit ourselves to the exact and specific disclosures hereof.

Desiring to protect our invention in the broadest manner legally possible, what we claim and desire to secure by Letters Patent of the United States, is:

1. As a new article of manufacture, a sealed capillary tube unit, embodying a capillary tube and a protecting casing therefor, one end of the casing closed by an end block through which the capillary tube extends, and a sealing cap over said end block.

2. As a new article of manufacture, a sealed capillary tube unit, embodying a capillary tube and a protecting casing therefor, an end block closing the casing, the capillary tube extending through said end block, and a sealing cap fitting over the end block and having its end wall spaced therefrom to form a chamber in communication with the tube, and the end wall of said sealing cap being constructed to be ruptured to open said chamber and tube.

3. As a new article of manufacture, a sealed capillary tube unit, embodying a capillary tube and a protecting casing therefor, an end block closing one end of the casing, the capillary tube extending through said block, a sealing cap fixed over the end block with the cap end wall formed with a weakening groove to permit said wall being broken from the cap.

4. In combination, an instrument of the pressure actuated type, and a presealed capillary tube unit, connected to said instrument, the said instrument having means for unsealing said unit when attached thereto, to place the tube unit in communication with the instrument.

5. In combination, an indicating instrument of the pressure type, and a presealed capillary tube unit for attachment and connection to said instrument, a connecting nipple on the instrument, the said nipple providing means for unsealing said unit in attaching the same thereto.

6. In combination, an indicating instrument of the pressure type, a presealed capillary tube unit for attachment to said instrument, the instrument end of said unit formed with a breakable sealing member, and the said instrument provided with means for breaking said sealing member, when the unit is attached to the instrument.

7. In combination, an indicating instrument of the pressure type, and a presealed capillary tube unit for attachment to said instrument, the instrument provided with an attaching nipple for receiving an end of the tube unit, the instrument end of the tube unit provided with a breakable sealing cap, and the said nipple formed with a projecting head for engagement with the tube sealing cap to break the same and place the tube unit in communication with the instrument.

8. In combination, an indicating instrument of the pressure type, and a presealed capillary tube unit for attachment to said instrument, the tube unit provided at one end with a breakable sealing cap, a connecting nipple on the instrument, having a recess for tightly and slidably receiving the sealing cap end of the unit, a coupling member carried by the tube unit for securing the same to the connecting nipple, and a member on the nipple within said recess for engaging and rupturing the sealing cap to open the tube unit for communication with the instrument.

9. An indicating instrument of the pressure type, having a connecting nipple for attachment to a capillary tube unit, the nipple formed with a central outwardly opening recess, a projecting head member at the inner end of said nipple recess, having ports therethrough in communication with a passage into the instrument, a presealed capillary tube unit provided at one end with a sealing cap for tightly and slidably fitting within the instrument nipple recess, a coupling member carried by the tube unit for engagement with the nipple to force the sealing cap end of the tube unit into the nipple recess, the tube unit sealing cap formed with a fracturable end wall for engagement by the projecting head member in the nipple to fracture said cap and place the tube in communication with the instrument.

10. As a new article of manufacture, a sealed capillary tube unit for attachment to an instrument of the pressure type, embodying a capillary tube and a protecting casing therefor, means for closing the casing at the instrument end thereof around the tube, and a sealing member closing that end of the tube at the closed end of the casing.

11. In combination, an instrument of the pressure type, a presealed capillary tube unit for attachment to said instrument, the instrument end of said unit sealed, and said instrument providing means for unsealing such end of the tube when the unit is attached to the instrument.

12. In combination, an instrument of the pressure type, a presealed capillary tube unit for removable attachment to the instrument, and said tube unit provided with a seal to be opened on attachment of the unit in operative relation with the instrument.

13. As a new article of manufacture, a presealed capillary tube unit for attachment to an instrument, the instrument end of the tube provided with a seal closing the same, and said seal adapted to be opened when the unit is attached to the instrument.

14. As a new article of manufacture, a sealed capillary tube unit for attachment to an instrument, said unit embodying, a capillary tube, a protecting casing therefor, and a seal closing the instrument end of the tube.

15. As a new article of manufacture, a capillary tube unit for operative attachment to an instrument of the pressure type, said unit embodying a sealed capillary tube charged with a fluid under pressure, said tube having a seal at one end constructed to be unsealed and opened upon attachment to an instrument.

16. As a new article of manufacture, a sealed capillary tube unit for operative attachment to an indicating instrument of the pressure type, said unit including a sealed capillary tube having a fracturable sealing member at and sealing that end of the tube to be operatively connected to the instrument, and said sealing member adapted to be fractured to unseal the tube for attachment of the unit in operative relation with the instrument.

17. As a new article of manufacture, a sealed capillary tube unit for operative attachment to an indicating instrument of the pressure type, said unit including a sealed capillary tube, a sealing cap having a fracturable end wall at and sealing that end of the tube to be operatively connected with the instrument, said cap end wall adapted to be fractured to unseal the tube for attachment of the unit and the tube thereof in operative relation with the instrument, and means for attaching the unit and operatively connecting the tube to the instrument.

Signed at Hampton, Elizabeth City County, Virginia, this 10th day of January, 1927.

THOMAS CARROLL.
GEO. L. DAWSON.